US006895427B2

(12) United States Patent
Quine et al.

(10) Patent No.: US 6,895,427 B2
(45) Date of Patent: *May 17, 2005

(54) SYSTEM AND METHOD FOR CLEANSING ADDRESSES FOR ELECTRONIC MESSAGES

(75) Inventors: Douglas B. Quine, Bethel, CT (US); Karl H. Schumacher, Westport, CT (US)

(73) Assignee: Pitney Bowes Inc., Stamford, CT (US)

( * ) Notice: Subject to any disclaimer, the term of this patent is extended or adjusted under 35 U.S.C. 154(b) by 868 days.

This patent is subject to a terminal disclaimer.

(21) Appl. No.: 09/750,952

(22) Filed: Dec. 28, 2000

(65) Prior Publication Data

US 2002/0087639 A1 Jul. 4, 2002

(51) Int. Cl.[7] .............................................. G06F 15/16
(52) U.S. Cl. ........................ 709/206; 709/245; 709/246
(58) Field of Search ......................... 709/206, 245–246, 709/207, 217, 205, 203, 224

(56) References Cited

U.S. PATENT DOCUMENTS

| | | | |
|---|---|---|---|
| 5,138,653 A | 8/1992 | LeClercq | 379/96 |
| 5,281,962 A | 1/1994 | Vanden Heuvel et al. | 340/825 |
| 5,283,856 A | 2/1994 | Gross | 395/51 |
| 5,333,152 A | 7/1994 | Wilber | 379/98 |

(Continued)

OTHER PUBLICATIONS

Two (2) webpages from www.switchemail.com website printed Nov. 1, 2002.
E Veripost, "Search Results", 5 pages, Aug. 15, 2001.
E Veripost, "Changed Your E–mail Address", 3 pages Aug. 20, 2001.
E Veripost, "Keep in Touch After Gruadation with Veripost", 2 pages, Apr. 30, 2001.
E Veripost, "Have you Changed your E–mail Address", 12 pages, Mar. 30, 2001.
Computermail.net, www.email addresses.com, "Free Email Address Directory", May 10, 2001.
Computermail.net, www.emailaddress.com, "Finding Email Address", May 10, 2001.
Computermail.net, www.emailaddress.com, "Large Email Directories", May 10, 2001.
IMarketing News, iMarketingNews.com/news/article, Jupiter Retailing Forum, ActiveNames Is Latest Victim of Economic Slowdown, May 21–22, Chicago.

(Continued)

Primary Examiner—Ario Etienne
Assistant Examiner—Abdullahi Salad
(74) Attorney, Agent, or Firm—Christopher J. Capelli; Angelo N. Chaclas

(57) ABSTRACT

A method and system for forwarding an e-mail message intended to be delivered to a first e-mail address to a second e-mail address in the event the first e-mail address is disfavored. An e-mail message is sent from a from a first computer that was originally addressed to a first e-mail address to a second computer that is capable of forwarding the e-mail message to a second e-mail address. The second computer receives the e-mail message and parses the first e-mail address from the e-mail message to determine if there is a second e-mail address associated with the first e-mail address. If there is a second e-mail address associated with the first e-mail address, the second computer sends the e-mail message to a third computer associated with the second e-mail address. If there is not, then the second computer determines if it can suggest a username, or a new username format to be used for the username associated with the domain name address of the disfavored e-mail address.

13 Claims, 8 Drawing Sheets

U.S. PATENT DOCUMENTS

| | | | | |
|---|---|---|---|---|
| 5,333,266 | A | 7/1994 | Boaz et al. | 395/200 |
| 5,377,354 | A | 12/1994 | Scannell et al. | 395/650 |
| 5,381,527 | A | 1/1995 | Inniss et al. | 395/200 |
| 5,406,557 | A | 4/1995 | Baudoin | 370/61 |
| 5,428,663 | A | 6/1995 | Grimes et al. | 379/57 |
| 5,436,960 | A | 7/1995 | Campana, Jr. | 379/58 |
| 5,455,572 | A | 10/1995 | Cannon et al. | 340/825 |
| 5,479,408 | A | 12/1995 | Will | 370/94.1 |
| 5,479,411 | A | 12/1995 | Klein | 379/88 |
| 5,483,466 | A | 1/1996 | Kawahara et al. | 364/514 |
| 5,487,100 | A | 1/1996 | Kane | 379/57 |
| 5,495,234 | A | 2/1996 | Capp | 340/825 |
| 5,513,126 | A | 4/1996 | Harkins et al. | 364/514 |
| 5,555,346 | A | 9/1996 | Gross et al. | 395/51 |
| 5,608,786 | A | 3/1997 | Gordon | 379/100 |
| 5,627,764 | A | 5/1997 | Schutzman | 364/514 |
| 5,635,918 | A | 6/1997 | Tett | 340/825 |
| 5,647,002 | A | 7/1997 | Brunson | 380/49 |
| 5,822,526 | A | 10/1998 | Waskiewicz | 395/200 |
| 5,844,969 | A | 12/1998 | Goldman et al. | 379/93.24 |
| 5,884,272 | A | 3/1999 | Walker et al. | 705/1 |
| 5,937,161 | A | 8/1999 | Mulligan et al. | 395/200.36 |
| 5,938,725 | A | 8/1999 | Hara | 709/206 |
| 5,944,787 | A | 8/1999 | Zoken | 709/206 |
| 5,961,590 | A | 10/1999 | Mendez et al. | 709/206 |
| 5,968,117 | A | 10/1999 | Schuetze | 709/206 |
| 5,978,837 | A | 11/1999 | Foladare et al. | 709/207 |
| 5,987,508 | A | 11/1999 | Agraharam et al. | 358/402 |
| 6,035,327 | A | 3/2000 | Buckley et al. | 709/206 |
| 6,049,291 | A | 4/2000 | Kikinis | 340/825.44 |
| 6,055,302 | A | 4/2000 | Schmersel et al. | 379/207 |
| 6,088,720 | A | 7/2000 | Berkowitz et al. | 709/206 |
| 6,092,114 | A | 7/2000 | Shaffer et al. | 709/232 |
| 6,118,856 | A | 9/2000 | Paarsmarkt et al. | 379/93.24 |
| 6,128,739 | A | 10/2000 | Flemming, III | 713/200 |
| 6,138,146 | A | 10/2000 | Moon et al. | 709/206 |
| 6,157,945 | A | 12/2000 | Balma et al. | 709/206 |
| 6,427,164 | B1 | 7/2002 | Reilly | 709/206 |

OTHER PUBLICATIONS

ActiveNames™, www.activenames.com, "About Us", Jan. 10, 2001, 24 pages.

Re–route.com, www.re–route.com, Re–route E–mail Forwarding Service, Mar. 12, 2001, 19 pages.

Wall Street Journal, Market Place, E–World, "Many Internet Users Find Themselves Stuck at Their Old Address", by Julia Angwin, Aug. 28, 2000.

Internet Solutions, "Email for Life", "Here's how to keep the same e–mail address through all of life's changes", Sheryl Canter, PC Magazine, Mar. 21, 2000.

The Washington Post, Business, "The Download, The address you leave behind", Shannon Henry, Mar. 15, 2001.

Return Path, "Purelist™ and email list optimization service".

Return Path, "ECOA™ and email change–of–address service".

Return Path, "Seven Techniques to Improve Email List Integrity", Tim Dolan, May 18, 2001.

Opt–innews™, "Return Path Grows To 90 Million Signing Brooks Brothers, Radisson & Publishers Clearinghouse", May 17, 2001.

ReturnPath, "About Us", Nov. 27, 2001, 11 pages.

ReturnPath, "ECOA Email Change–of–Address".

ReturnPath, ECOA and PureList™, May 17, 2001, 15 pages.

ReturnPath, "SmartBounce™", What is SmartBounce?, Jan. 10, 2001, 7 pages.

500

TO: DQuine@luv-npi.com

RE: HELLO

I HAVE NOT COMMUNICATED WITH YOU IN A LONG TIME - HOW IS EVERYTHING?

DELIVERY FAILURE REPORT

YOUR DOCUMENT: HELLO
WAS NOT DELIVERED TO: dquine@luv-npi.com
BECAUSE: THE SPECIFIED ADDRESS CONTAINS A HOST OR DOMAIN NAME THAT COULD NO BEFOUND BY THE DOMAIN NAME SERVER OR LOCAL HOSTS FILE.

TO: DQuine@luv-npi.com

RE: HELLO

I HAVE NOT COMMUNICATED WITH YOU IN A LONG TIME - HOW IS EVERYTHING?

SYSTEM AND METHOD FOR CLEANSING ADDRESSES FOR ELECTRONIC MESSAGES

FIELD OF THE INVENTION

The present invention relates to a system and method for forwarding electronic messages, and more particularly, relates to cleansing the addresses for e-mail messages that were previously returned to the sender as undeliverable.

BACKGROUND OF THE INVENTION

Recent advances in telecommunications networks have drastically altered the manner in which people interact and conduct business. These advances promote efficiency and convenience in one's ability to receive important information. With this in mind, individuals and businesses today find that their physical and electronic addresses are changing faster than ever with increased mobility and competing message delivery services. Deregulation and privatization of the global postal systems, competing package delivery services, and rapid growth of multiple competing electronic mail (e-mail) systems are creating an environment in which there is no single point of contact for address correction as there was when the sole messaging provider was the national postal service.

Users who enjoy the benefit of sending and receiving e-mail messages typically subscribe to an Internet Service Provider (ISP) offering such e-mail capabilities (e.g., America Online (AOL), Netcom, and Redconnect) and/or may subscribe to an internet based e-mail service (e.g., juno, rocketmail, yahoo) which each is associated with a particular e-mail address. Thus, the e-mail address is unique to the e-mail service provider. The uniqueness of an address to a selected provider is often apparent on the face of the address, e.g., DQuine@gaol.com, Quine@juno.com or DouglasQuine@yahoo.com. A user or subscriber to a particular e-mail service may from time to time desire or need to change service providers (e.g., from DQuine@aol.com to QuineDo@pb.com). Exemplary motivation for these changes may derive from the fact that an alternative service provider charges lower rates, or the existing provider's inability to upgrade its service.

A user who desires to change from one e-mail service provider to another suddenly faces the reality of being bound to the old service provider because the user's address is unique to that one provider. A sudden and complete changeover is in many circumstances impossible because the community of people who wish to send electronic messages to the user are only aware that the old address exists. For example, an e-mail address may be published in an industry directory that is only published once every year or two years. Alternatively, the e-mail address may be printed on a business card which cannot be retracted and corrected. Thus, the user incurs a potentially significant loss of prospective business by abandoning the old address.

Currently, there is no effective means in place for address correction of e-mail addresses. Even if the e-mail sender is highly diligent, there are no resources or processes available to identify corrected electronic address information. The problem is further accentuated by the fact that extreme competition in internet service providers, and likewise e-mail service providers, results in extremely high obsolescence of e-mail addresses with no means for e-mail forwarding (e.g., closing an AOL e-mail account provides no option for forwarding e-mail intended for that account to a new e-mail address).

Further, today's web savvy users may have multiple e-mail addresses which periodically change as new features develop or are lost. Entire domain names can be lost (e.g., lostdomain.com) and all mail directed there may be lost as well. In either case, typically the MAIL DAEMON message is returned to the sender, notifying the sender that the e-mail address cannot be found and e-mail message is being returned to the sender.

Some service providers offer their user-subscribers the option of a message forwarding service. These forwarding services operate by receiving the incoming message, retrieving the portion of the incoming message that identifies a selected user who subscribes to the forwarding service, associating the selected user with a forwarding address through the use of a lookup table, and transmitting the message to the forwarding address. The forwarding services differ from the normal message delivery service that the central service provider offers because a portion of the forwarding address belongs to another central service provider. Thus, the forwarded message is actually delivered to its intended recipient by the other or second service provider, i.e., the forwarded message passes through two central service providers, as opposed to just one provider. The intended message recipient is free to change the second provider with regularity provided that the recipient always informs the forwarding service of each change in the second provider. However, this message forwarding system only works with viable e-mail address, that is, the e-mail address associated with the first service provider must still be active and not obsolete. In fact, few e-mail services offer forwarding services and few, if any, offer to forward e-mail after the account is closed. Otherwise, the first service provider is only enabled to send the later mentioned MAIL DAEMON message back to the original sender of the -e-mail message.

SUMMARY OF THE INVENTION

Accordingly, the present invention relates to a method and system for forwarding an e-mail message intended to be delivered to a first e-mail address to a second e-mail address in the event the first e-mail address is disfavored. An e-mail forwarding computer is located at a third e-mail address that is programmable to associate disfavored e-mail addresses with forwarding e-mail addresses.

In use, a user at a first computer sends an e-mail message to a first e-mail address at a second remote computer. When this e-mail message is returned to the user at the first computer, the user resends the e-mail that was originally addressed to a first e-mail address to a second e-mail forwarding computer that is capable of forwarding the e-mail message to a second e-mail address. The second computer receives the e-mail message and parses the first e-mail address from the e-mail message to determine if there is a second e-mail address associated with the first e-mail address. If there is a second e-mail address associated with the first e-mail address, the second computer sends the e-mail message to a third computer associated with the second e-mail address.

If there is not a second e-mail address associated with the first e-mail address then the domain name of the first e-mail address is parsed therefrom to determine if the domain address of the e-mail address has been registered with the second computer. If yes, then a cleansed or suggested new format for the once undeliverable e-mail message may be sent to the user of the first computer.

Thus, an advantage of the present invention is that there is no cooperation needed by the e-mail server associated with the disfavored e-mail address. That is, if an e-mail address becomes disfavored (it is no longer an active e-mail address) either because the associated e-mail server ceases to exist, or the e-mail account has been left abandoned for a host of reasons, the present invention e-mail forwarding system nevertheless operates because no cooperation is needed from the later e-mail server. An additional benefit is that when an e-mail message is forwarded by the present invention, the privacy of the recipient is protected because the sender of the e-mail message is preferably not notified of the recipient's forwarding address.

DETAILED DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which:

FIGS. 5A and 5B depict e-mail messages illustrating the operability of the e-mail messaging system of FIG. 1;

DETAILED DESCRIPTION OF THE PREFERRED EMBODIMENTS

Figure 1:
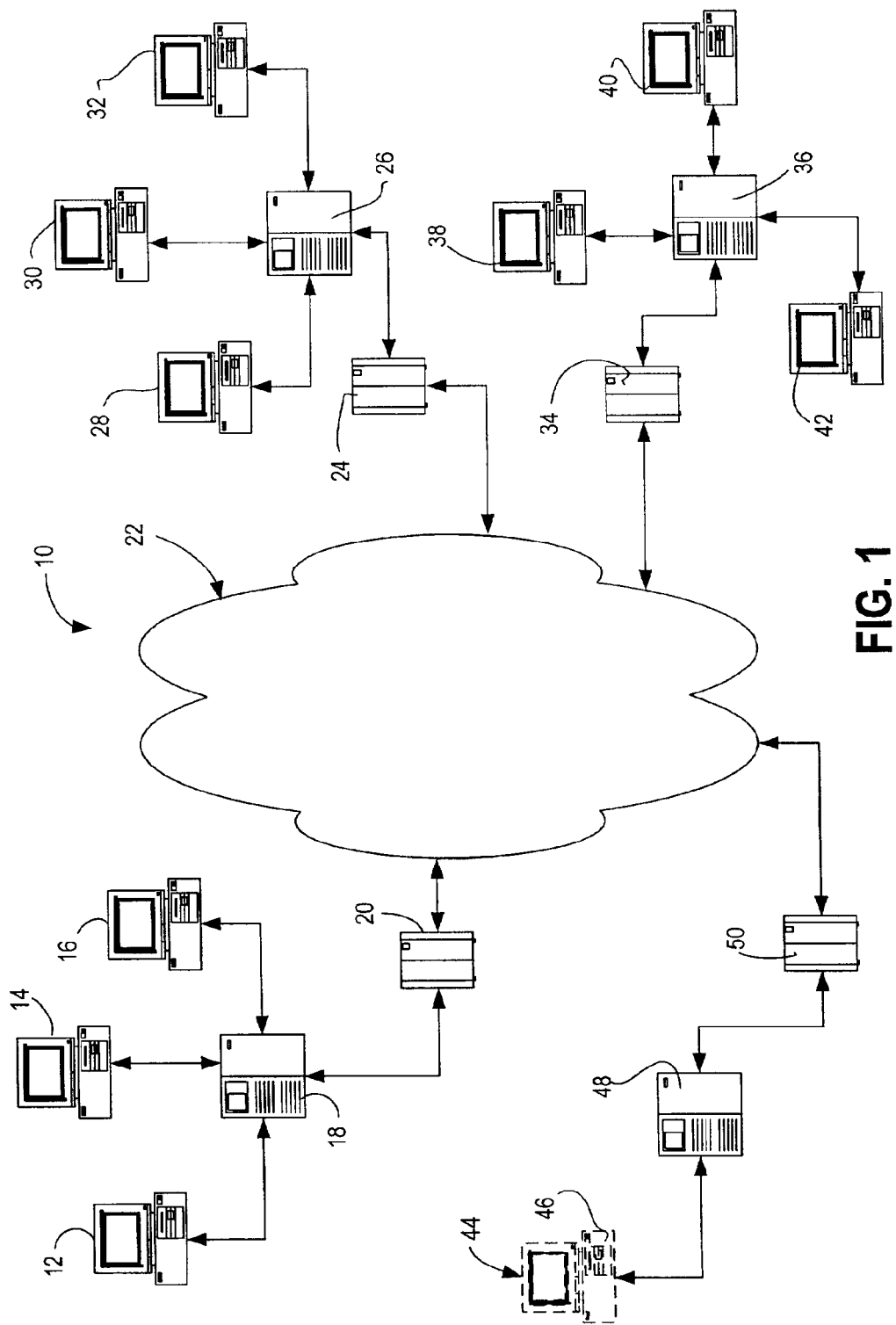
FIG. 1 depicts an electronic e-mail messaging system embodying the present invention.

FIG. 1 schematically depicts a conventional INTERNET telecommunications system 10. The FIG. 1 system is exemplary in nature. The present invention can be implemented as program control features on substantially all telecommunications service provider systems, and system 10 is intended to represent any operable telecommunications system that is used by any telecommunications service provider in conducting communication operations (e.g., facsimile, pager, mobile phone and PDA computers).

It is to be appreciated that the term "INTERNET" is well known in the art as designating a specific global international computer network that operates according to the TCP-IP protocol. A portion of the INTERNET receives or has in the past received funding from various United States governmental agencies including ARPA, NSF, NASA, and DOE. INTERNET communications protocols are promulgated by the Internet Engineering Task Force, according to standards that are currently set forth in RFC 1602.

Telecommunications system 10 includes a plurality of user or signal origination sites 12, 14 and 16, with each site being depicted in reference to a PC capable of generating and transmitting e-mail messages, wherein each site 12, 14 and 16 corresponds to a specific telecommunications address. A user may utilize one site or a plurality of sites. A single city or local service area may have millions of these signal origination sites. Each site 12, 14 and 16 corresponds to a telecommunication address that belongs to an individual, business, and other entity having need to avail themselves of telecommunications services.

It is to be understood that preferably each origination site 12, 14 and 16 feeds its signal (addressed to a subscriber identified at a selected service provider) to an internet service provider 18 (ISP), which in turn preferably feeds the signal to a local router node 20 that directs the local signal to a relay system, e.g., the INTERNET cloud 22, which transmits the signal to a router 24 through a series of relays. The signal eventually arrives at an internet service provider 26 through router 24.

As can be seen in FIG. 1, a plurality of destination sites 28, 30, 32, 38, 40 and 42 are shown connected to internet service providers 26 and 36 with each site being depicted in reference to a PC capable of generating and transmitting e-mail messages, wherein each site corresponds to a specific telecommunications address. It is of course to be appreciated that telecommunications system 10 includes a plurality of routers (e.g., routers 24 and 34 with each internet service provider being connected to a plurality of user sites (e.g., PC's 38, 40 and 42).

In accordance with the present invention, telecommunications system 10 additional includes a messaging forwarding system 44, which as will be further discussed below, enables e-mail messages to be automatically forwarded to a forwarding address, which forwarding address is associated with a currently undeliverable e-mail address. Messaging forwarding system 44 preferably includes a PC 46 connected to an internet service provider 48, which PC 46 is provided with a unique e-mail address (corrections@e-mailangel.com) and software programmed to perform the below described steps necessary to operate the present invention e-mail forwarding system 44. Internet service provider 48 is preferably connected to INTERNET 22 via router 50.

Figure 4:
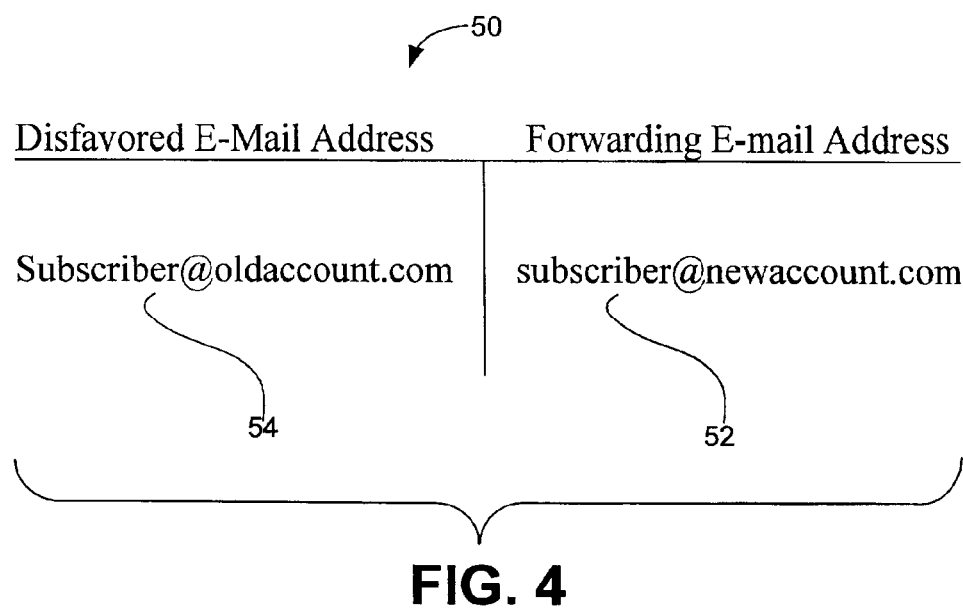
FIG. 4 depicts a look-up table used by the present invention.

As shown in FIG. 4, system 44 includes a software program that includes a lookup table 50, which is programmable by users to provide an e-mail forwarding address 52 associated with pre-programmed defunct (undeliverable) e-mail address[es] 54. It is to be appreciated that users of the present invention e-mail forwarding system 44 may access and program the look-up table 50 of system 44 through any conventional known means, including via the internet 22 in which a user at PC site 28 accesses the look-up table 50 in system 44, via the internet 22, via routers 24 and 50, and internet service providers 26 and 48. Look-up table 50 may include a plurality of defunct subscriber addresses (54+N), with each defunct address being associated with one or more forwarding addresses (52+M).

It is to be appreciated that in this description of the present invention system 44, mention is made to both a "user" and "subscriber" of system 44. It is to be understood that a "user" of system 44 refers to anyone who is capable of transmitting an e-mail message and accesses system 44 when it is desired to forward the message to a forwarding address, which forwarding address the sender is unaware of. A "subscriber" of system 44 refers to anyone who subscribes to the e-mail forwarding service of system 44 in which the subscriber registers both a defunct e-mail address 54 and at least one e-mail forwarding address 52 with system 44. And of course e-mail forwarding system 44 is accessible by any user.

In illustration, if a subscriber of system 44 closes an e-mail account (e.g., user@oldaccount.com) for what ever reason, the subscriber may however still desire to continue to receive messages sent to that address (e.g., user@oldaccount.com), but now wants to receive those messages at a different account (e.g., subscriber@newaccount.com). In the prior art, to accomplish this the subscriber had to resort to informing everyone who had the old e-mail address (e.g., user@oldaccount.com)

of the new e-mail address (e.g., subscriber@newaccount.com). In accordance with the present invention, the subscriber now merely accesses the subscriber's designated account in system 44, via any known means such as the internet, registers the defunct e-mail address (e.g., user@oldaccount.com) and associates it with a desired forwarding e-mail address (e.g., subscriber@newaccount.com). Thus when a sender of an e-mail desires to transmit a message to a subscriber of system 44 but only knows the subscriber's old e-mail address (e.g., user@oldaccount.com), which account is no longer active, the user now merely looks to system 44 to forward the message to an active account (e.g., subscriber@newaccount.com), as will be discussed further below.

As indicated above, FIG. 1 is exemplary in nature, and those skilled in the art understand that equivalent substitutions of system components can be made. For example, electrical communications over conductive telephone lines, optical communications over optical fibers, radio communications, and microwave communications are substantially equivalent for purposes of the invention. Likewise, messages could be relayed through e-mail, facsimile, pager, PDA device or other capable communications system.

Figure 2:
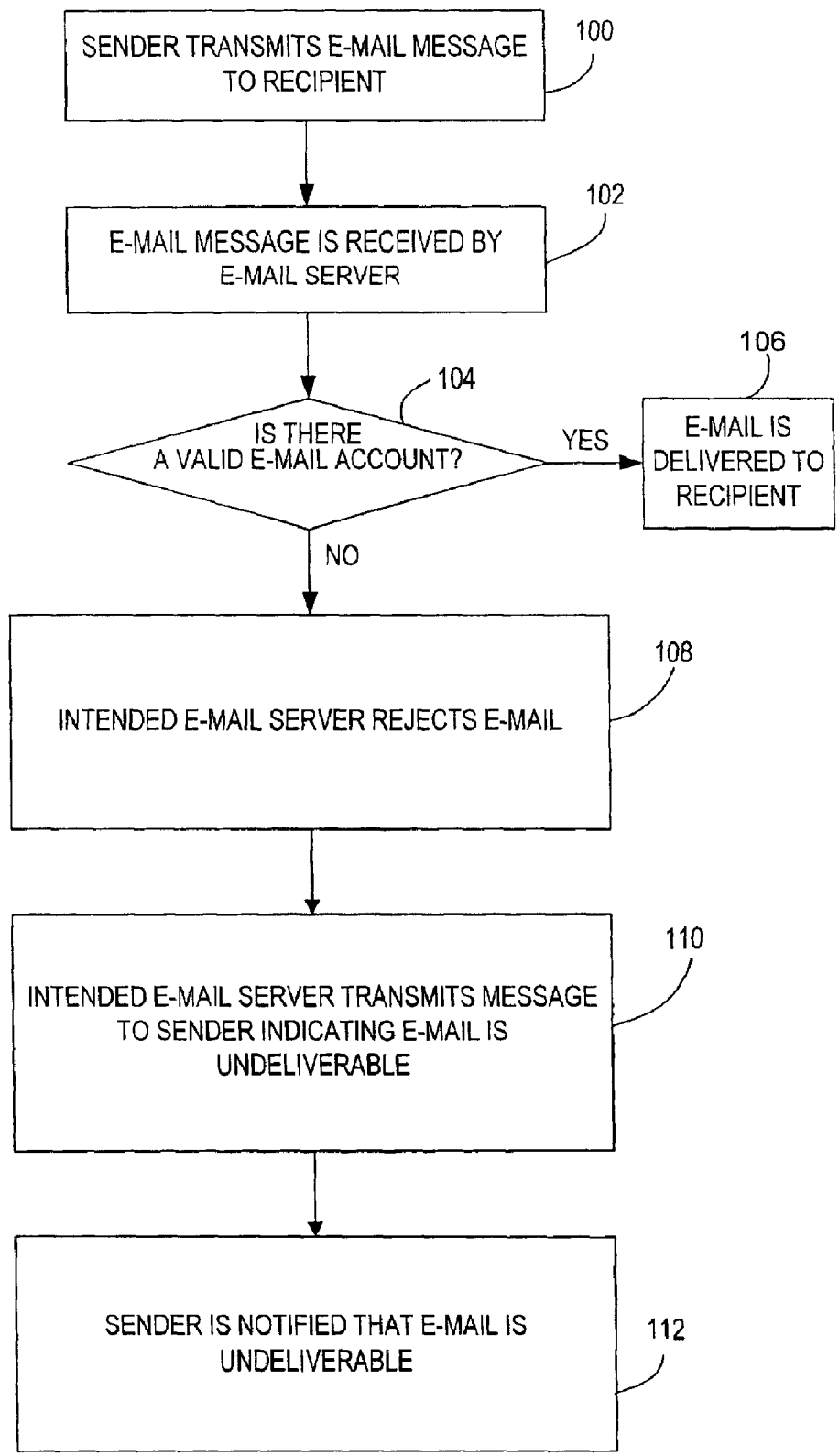
FIGS. 2 and 3 depict flowcharts depicting the operation of the present invention.
Figure 3:
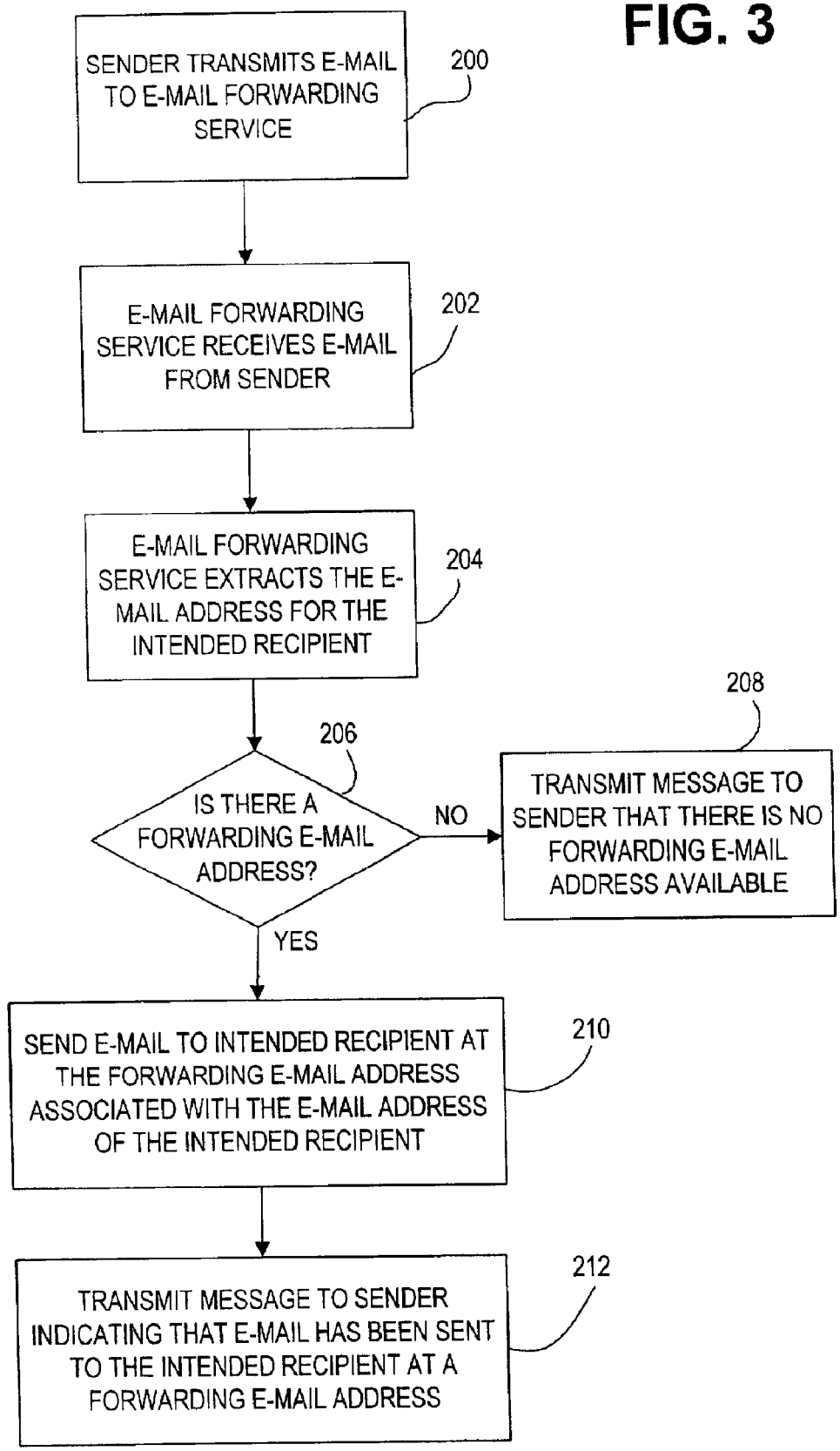

The method of use of system 44 will now be described with reference to FIGS. 2, 3 and 5 in conjunction with FIG. 1. Referring now to FIG. 2, when an e-mail sender 14 desires to transmit a message to a recipient 30 having a known e-mail address (e.g., quine@luv-npi.com) of the recipient, the sender 14 transmits the e-mail message 500 (FIG. 5*a*) through conventional e-mail protocol, whereby the message is delivered to the identified mail server 26 (e.g., luv-npi.com) of the recipient 30, via the senders ISP server 18 (step 100). The recipient's 30 mail server 26 then receives the e-mail message (step 102), and if the e-mail account is valid (e.g., quine@luv-npi.com) (step 104), the e-mail message is then accessible to the view and thus considered delivered (step 106). If the account is not a valid account (e.g., quine@luv-npi.com) then the identified e-mail server 26 (e.g., luv-npi.com) rejects the request (step 108) and sends a MAIL-DAEMON message 510 (FIG. 5*b*) to the sender's 14 e-mail server 18 indicating that the message is not deliverable (step 110). The sender's e-mail server 18 then sends a message to the sender 14 that the attached e-mail message is undeliverable.

Since the sender 14 cannot contact the recipient (e.g., quine) via the now defunct e-mail address 54 (e.g., quine@luv-npi.com), the sender 14 is presented with the problem of how to contact the recipient. In order to overcome this problem, the present invention e-mail forwarding system 44 provides a solution by forwarding the e-mail message to a new address so long as the recipient 30 (e.g., quine) subscribes to the forwarding service of the system 44. In the current illustrative example, the recipient (e.g., quine) registers the defunct e-mail address 54 (e.g., quine@luv-npi.com) with the system 44 and instructs the system to forward all messages to a specified forwarding e-mail address 52 (e.g., quine@docsense.com), as depicted in the look-up table of FIG. 4.

Returning now to the sender's 14 situation in which the sender 14 still desires to transmit the e-mail message 500 but does not know the correct e-mail address. In accordance with the present invention, the sender 14 now forwards the entire message 510 that was previously sent to the intended recipient's defunct e-mail address (e.g., quine@luv-npi.com), and rejected, to the e-mail address (e.g., corrections@e-mailangel.com) assigned to the e-mail forwarding system 44 (step 200). The e-mail server 48 (e.g., e-mailangel.com) that received the message then informs the forwarding system 44 of the receipt of this message and afterwards the forwarding system 44 receives the message from the e-mail server 48 (step 202). The forwarding system 44 then parses message 510 and extracts the intended address for the recipient (e.g., quine@luv-npi.com) from the message (step 204). The forwarding service 44 then does a look-up in table 50 for the intended address (e.g., quine@luv-npi.com) to determine if this address has been registered by a subscriber in the forwarding system 44 (step 206). If no, system 44 sends an e-mail message back to the sender 14 informing the sender 14 that the defunct address of the recipient 30 (e.g., quine@luv-npi.com) is not registered with the forwarding system 44 (step 208). If yes, forwarding system 44, sends the e-mail message 510 addressed to the recipients defunct address 54 (e.g., quine@luv-npi.com) to the recipient subscriber's new e-mail address 52 (e.g., quine@docsense.com) as prescribed in the look-up table 50 of the forwarding system 44. Preferably, forwarding system 44 then sends an e-mail to the sender 14 indicating that the message original addressed to a defunct e-mail address has now been properly forwarded.

Thus, a clear advantage of the present invention e-mail forwarding system 44 is that a sender merely forward a rejected e-mail message to the e-mail address (e.g., corrections@e-mailangel.com) associated with the forwarding system 44 to determine if the previously rejected message can be forwarded to a proper e-mail address. And if it can, the forwarding system automatically forwards the message to an e-mail address as prescribed by the recipient. Thus, a user of system merely has to forward a rejected e-mail message to forwarding system 44 to utilize its forwarding services. Therefore, no internet access is required, only access to an e-mail server is required which is quite advantageous since many e-mail users only have access to an e-mail server and not an internet server, such as staff employees in corporations and home users who utilize free, or inexpensive e-mail services. Furthermore, in contrast to directory services, the system design preserves recipient privacy by not providing the new e-mail address to the sender.

Figure 6:
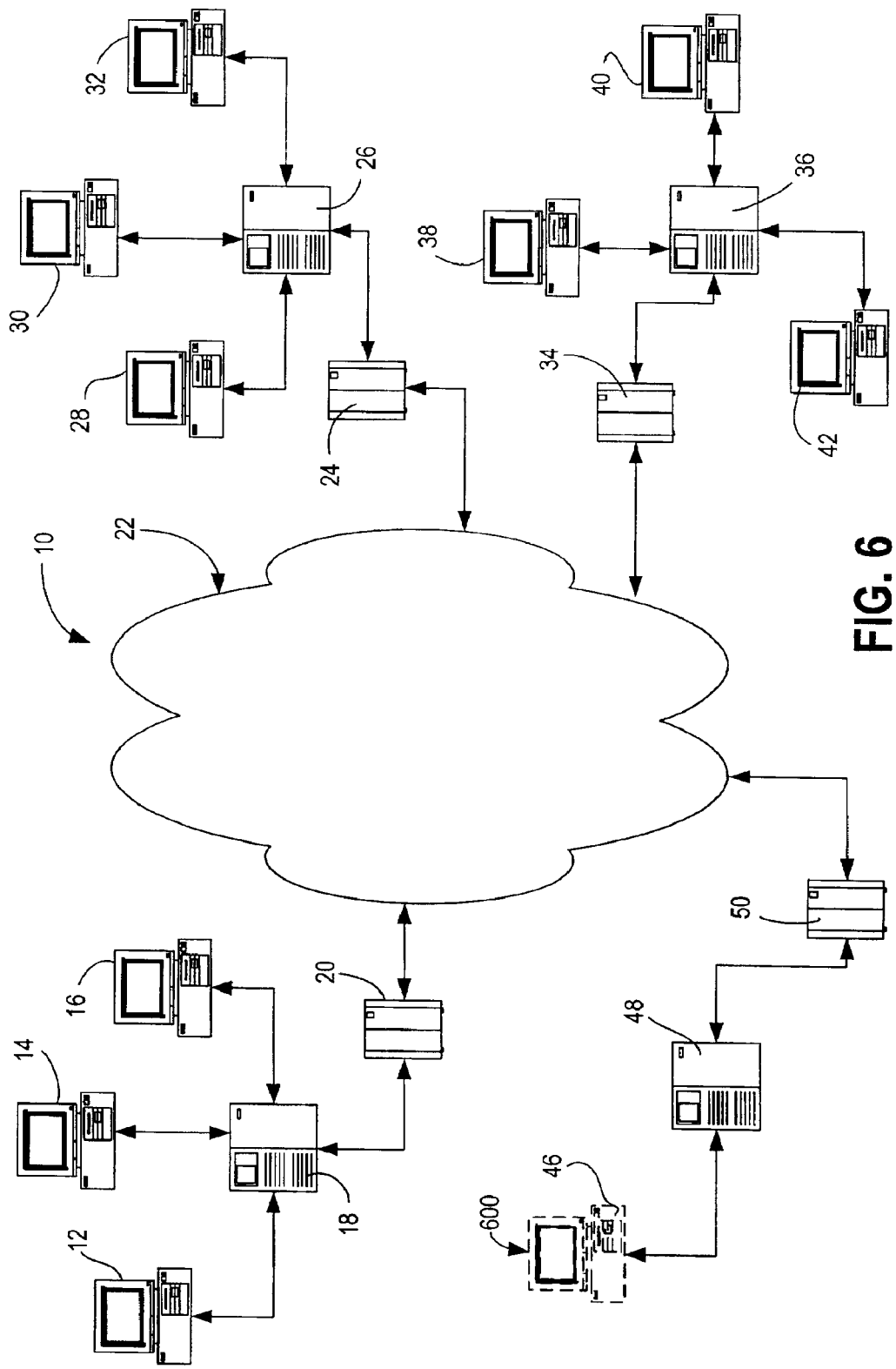
FIG. 6 depicts an electronic e-mail messaging system embodying another embodiment of the present invention.

With reference now to FIG. 6, another embodiment of the present invention is depicted wherein there is shown messaging system 600 having the capabilities and operational features of the above-described messaging forwarding system 44 of FIGS. 1–5 but with the added capabilities of being able to correct or suggest a correct e-mail address. An example being the situation when a sender wants to send an e-mail to Doug Quine, and the senders knows that Doug Quine works at Pitney Bowes and that he has an e-mail address at Pitney Bowes but does not know the precise e-mail address but nevertheless wants to send an e-mail to Doug Quine at Pitney Bowes. Thus the sender then goes ahead and transmits an e-mail to Doug Quine using an educated guess that Doug Quine's e-mail address is Doug.Quine@pb.com (when it actually is quinedo@pb.com). In one embodiment described below, when the sender transmits the e-mail to Doug.Quine@pb.com, the messaging forwarding system 600 is able to suggest sending the e-mail to quinedo@pb.com.

Preferably, the messaging system 600 operates within an enterprise (e.g., having a single computer or within an intranet) or may operate in the public domain where non-affiliated users may utilize the information to improve address hygiene with the result being that digital document delivery success is enhanced. In essence, and as described in further detail below, the present invention enables the successful delivery of an e-mail to a person without knowing the person knowing the complete or correct e-mail address. In a first embodiment for messaging system 600 and illustrated in FIG. 6, messaging system 600 is to be understood to operate in the public domain with that of system 44 shown in FIG. 1.

In reference to FIGS. 7a and 7b, its method of operation will now be described. First, when an email sender 12 desires to transmit a message to a recipient 40 having either what is thought as a known e-mail address, or an educated guess of the recipient's e-mail address (e.g., Douglas.Quine@pb.Com) as described above, the sender 12 nevertheless transmits the e-mail message through conventional e-mail protocol, whereby the message is delivered to the identified domain name mail server 36 (e.g., pb.com) specified in the recipient's e-mail address (e.g., Douglas.Quine@pb.com), via the senders ISP server 18 (step 600). The specified domain name mail server 36 then receives the e-mail message (step 602), and if the e-mail account is not recognized by the domain name mail server 36 (e.g., Douglas.Quine@pb.com) (step 604), then the specified domain name mail server 36 rejects the request and sends an undeliverable message (e.g., a MAIL-DAEMON message) back to the sender 12, via the sender's e-mail server 18 indicating that the message is not deliverable (step 610). As described above, the sender's e-mail server 18 then sends the message to the sender 12 that the attached e-mail message is undeliverable.

Figure 7A:
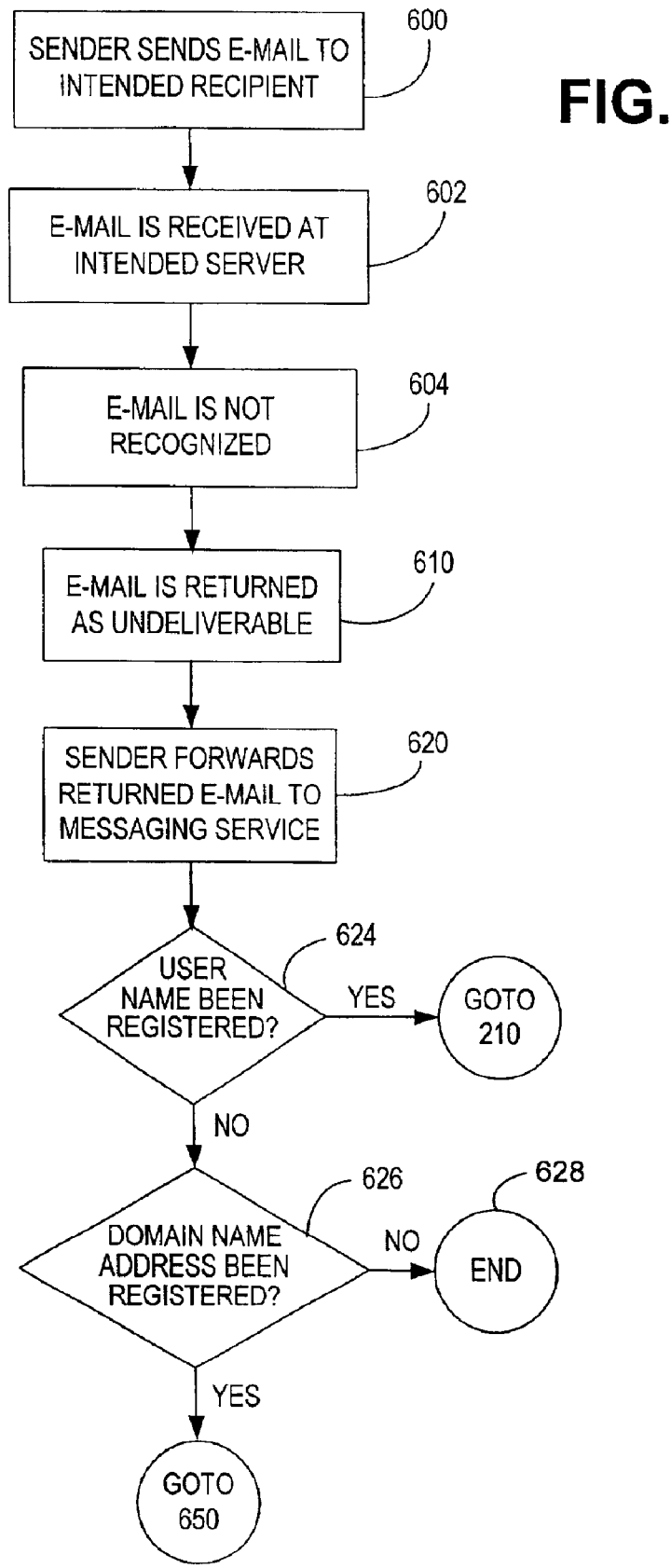
FIGS. 7a and 7b depict the method of operation for e-mail messaging system of FIG. 6.

With continuing reference to FIG. 7a, since the sender 12 was unsuccessful in delivering the e-mail message to the recipient, the sender then forwards the e-mail message to the messaging forwarding system 600 of the present invention (step 620). The messaging forwarding system 600 then receives the forwarded e-mail message (step 622), and as described above, determines if a forwarding address has been registered for the undeliverable forwarded e-mail message (step 624). If yes, the above described process of step 210 is then performed. If no, a determination is then made as to whether the domain name address (e.g., pb.com) of the undeliverable e-mail address (e.g. Douglas.Quine@pb.com) has been registered with the messaging forwarding system 600 (step 626). If no, then messaging system 600 then preferably sends a message back to the sender that it is unable to provide a forwarding e-mail address for the undeliverable e-mail address (step 628).

Figure 7B:
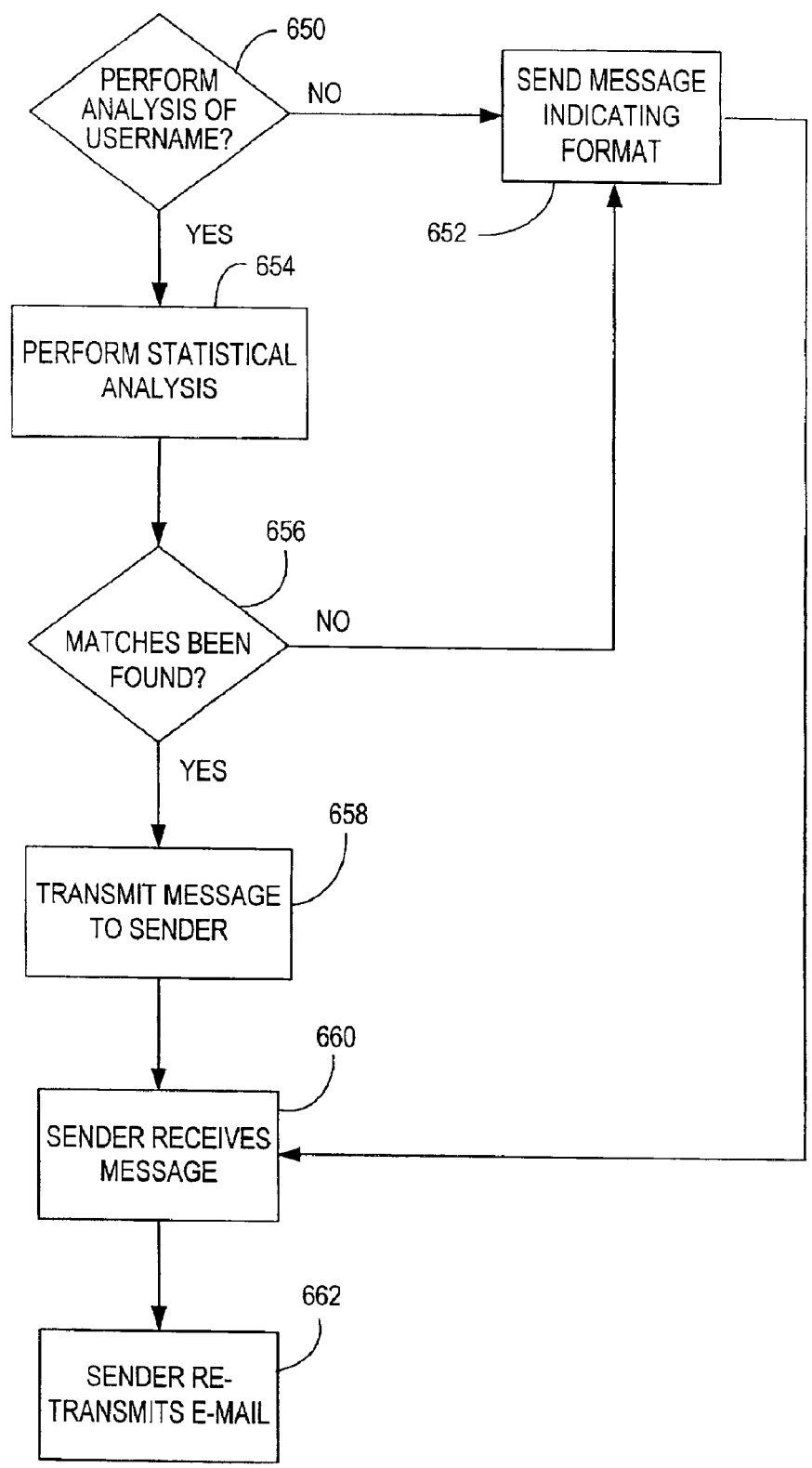

If yes, and with reference now to FIG. 7b, a determination is made as to whether an analysis to determine a "closest match" is to be performed (step 650). As will be described further below, this "closest match" determination is essentially the performance at an analysis to find the closest match to the username (e.g., douglas.quine) of the undeliverable e-mail in comparison to those usernames that are pre-registered with the messaging system 600 in association with the subject domain name address (e.g., pb.com). Preferably, and as further described below, when the administrator of the mail server 36 opens an account with the present invention messaging system 600, the administrator decides whether to list all current usernames associated with the subject domain name address (e.g. pb.com) so as to enable the performance of the closest match determination. If no "closest match" determination is to be performed (e.g., either the administrator of the subject domain name address has decided not to list all associated usernames, or has decided not to enable this feature in the messaging system) then the messaging system 600 preferably transmits an e-mail message back to the sender 12 indicating the format for usernames followed for that domain name address (e.g., pb.com) (step 652). An example of such a message is: THERE IS NO KNOWN E-MAIL ADDRESS FOR DOUGLAS.QUINE@PB.COM—HOWEVER, THE FORMAT FOR USERNAMES RESIDING AT PB.COM IS TO USE THE FIRST SIX CHARACTERS OF THE LAST NAME FOLLOWED IMMEDIATELY BY THE FIRST TWO CHARACTERS OF THE FIRST NAME—FOR EXAMPLE: MR. TOM WATSONER WOULD BE WASTONTO@PB.COM AND MS. ADELE ZON WOULD BE ZONAD@PB.COM —TRY TO REFORMAT YOUR USERNAME IN ACCORDANCE WITH THIS FORMAT AND RE-TRANSMIT YOUR E-MAIL MESSAGE—GOOD LUCK.

If yes, that is an analysis is to be performed for the undeliverable e-mail address (e.g., Douglas.Quine@pb.com), then an analysis of the username portion (e.g., Douglas.Quine) of the undeliverable e-mail address (e.g., Douglas.Quine@pb.com) is performed to determine a closest match (based upon prescribed criteria) to a username(s) from all the usernames registered with the messaging system 300 that are associated with the domain name (e.g., pb.com) of the undeliverable e-mail address (step 654). A determination is then made as to whether a closest match(es) has been made (step 656). If, no then the process goes to the above described step 652. If yes, then a message is sent to the sender 12 indicating the closest match(es) that have been determined (step 658). An example of such a message is.

IT HAS BEEN DETERMINED THAT THE CLOSEST MATCH FOR DOUGLAS.QUINE@PB.COM IS QUINEDO@PB.COM. IT IS SUGGESTED THAT THE E-MAIL MESSAGE BE RE-SENT TO THIS E-MAIL ADDRESS.

When the sender 12 receives this e-mail message suggested the closest match alternative e-mail address (e.g., quinedo@pb.com) (step 660) the sender may then retransmit the once undeliverable e-mail message to the closest match e-mail address (step 662).

In summary, an e-mail forwarding system having a dedicated e-mail address for automatically forwarding e-mail has been described. Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method for transmitting an e-mail message to a preferred e-mail address that has been sent from a sender address to a second address, the method comprising the steps of:

receiving the e-mail message at the second address;

parsing non-preferred e-mail address from the e-mail message at the second address and determining if there is a preferred e-mail address associated with the non-preferred e-mail address;

if yes, sending the e-mail message from the second address to the preferred e-mail address;

if no, parsing the non-preferred e-mail address to extract the domain name and determining if the domain name has been registered with the second address;

determining if a list of usernames for the parsed domain name has been registered with the second address;

determining if them is a closest match between a username of the non-preferred e-mail address and from said list of usernames for the parsed domain; and sending the closest match username to the sender address if it is determined that there is a closest match.

2. A method as recited in claim 1 further including the step of sending an e-mail message to the sender address from the second address indicating that the e-mail has been sent to the preferred e-mail address.

3. A method as recited in claim 1 further including the step of sending an e-mail message to the sender address from the second address indicating that the e-mail message was not forwarded if the preferred e-mail address is not associated with the non-preferred e-mail address.

4. A method as recited in claim 1 wherein the parsing step includes the step of comparing the non-preferred e-mail address to a look-up table to determine if the non-preferred e-mail address is contained in the look-up table.

5. A method as recited in claim 1 further including the steps of:

receiving a response message at the second address indicating that the e-mail message was not delivered to the non-preferred email address; and relaying the response message from the second address to the sender address.

6. A method for correcting an e-mail message that has been determined as being undeliverable via a remote e-mail correcting computer having a unique e-mail address, the method comprising the steps of:

prescribing at least one domain name in the remote e-mail forwarding computer by a subscriber;

prescribing at least one format for formatting e-mail addresses intended to be sent to the at least one domain name;

sending from a user to the remote computer an e-mail message addressed to an intended e-mail address;

receiving at the remote computer from a sender's computer the e-mail message addressed to the intended e-mail address;

parsing the intended e-mail address from the e-mail message in the remote computer to determine if the domain name of the e-mail message has been prescribed with the remote computer;

sending a message to the sender's computer indicating the prescribed at least one format for the parsed domain name address if the parsed domain name has been prescribed with the remote computer;

prescribing a plurality of correct usernames for the prescribed domain name in the remote computer;

determining in the remote computer if there is a closest match between one of the prescribed correct usernames with that of the intended email address sent to the remote computer; and sending the closest match username to the sender address if it is determined that there is a closest match.

7. A method for forwarding an undeliverable e-mail message comprising the steps of:

receiving an e-mail message, from a first electronic location referencing a first e-mail address, at a second electronic location;

parsing the referenced e-mail address from the e-mail message at the second electronic location to determine if there is a second e-mail address associated with the referenced e-mail address;

if yes, sending the e-mail message from the second electronic location to a third electronic location associated with the second e-mail address; and if no, parsing the referenced e-mail address to extract the domain name from the referenced e-mail address to determine if the domain name of the referenced e-mail address has been registered with the second electronic location;

determining if a list of usernames for the parsed domain name has been registered with the second electronic location;

determining if there is a closest match between the username of the e-mail and with any username registered with the second electronic location; and sending the closest match username to the sender address if it is determined that there is a closest match.

8. A method as recited in claim 7 further including the step of sending the closest match username to a user of the first electronic location if it is determined that there is a closest match between the username of the e-mail message and with the usernames registered with the second electronic location.

9. A method as recited in claim 7, further including the step of forwarding the email message from the second electronic location to the third electronic location without notifying a user at the first electronic location of the second email address.

10. A method as recited in claim 7 further including the step of sending an e-mail message to the first electronic location from the second electronic location indicating that the e-mail has been sent to the second e-mail address.

11. A method as recited in claim 7 further including the step of sending an e-mail message to the first electronic location from the second electronic location indicating that the e-mail message was not forwarded to the second e-mail address if the second e-mail address is not associated with the referenced e-mail address.

12. A method as recited in claim 7 wherein the parsing step includes the step of comparing the referenced e-mail address to a look-up table to determine if the referenced e-mail address is contained in the look-up table.

13. A method as recited in claim 7 further including the steps of:

receiving a response message at the second electronic location from the third electronic location indicating that the e-mail message was not delivered to the third electronic location; and relaying the response message from the second electronic location to the first electronic location.

* * * * *